US007963216B2

(12) United States Patent
Ou-Young

(10) Patent No.: US 7,963,216 B2
(45) Date of Patent: Jun. 21, 2011

(54) APPARATUS FOR IMPROVING SURFACE SMOOTHNESS AND INTERNAL FIRMNESS OF CYLINDRICAL FOOD PRODUCTS

(76) Inventor: Robert Ou-Young, Chung-Ho (TW)

( * ) Notice: Subject to any disclaimer, the term of this patent is extended or adjusted under 35 U.S.C. 154(b) by 204 days.

(21) Appl. No.: 12/503,068

(22) Filed: Jul. 14, 2009

(65) Prior Publication Data

US 2011/0011285 A1 Jan. 20, 2011

(51) Int. Cl.
*A21C 9/04* (2006.01)
*A23P 1/00* (2006.01)

(52) U.S. Cl. ...................................................... 99/450.1

(58) Field of Classification Search ................. 99/450.1, 99/450.2, 450.6; 198/608, 611, 624
See application file for complete search history.

(56) References Cited

U.S. PATENT DOCUMENTS

| | | | | | |
|---|---|---|---|---|---|
| 3,244,320 | A | * | 4/1966 | Vedvik | 221/124 |
| 3,532,510 | A | * | 10/1970 | Zimmerman | 426/90 |
| 4,554,958 | A | * | 11/1985 | Schmidt | 144/4 |
| 4,656,908 | A | * | 4/1987 | Elwood | 83/863 |
| 4,996,915 | A | * | 3/1991 | Morikawa et al. | 99/450.2 |
| 5,318,629 | A | * | 6/1994 | Raque et al. | 118/18 |
| 5,893,321 | A | * | 4/1999 | Capetta et al. | 99/450.2 |
| 2005/0072318 | A1 | * | 4/2005 | Ou-Young | 99/450.1 |
| 2006/0107846 | A1 | * | 5/2006 | Foulon et al. | 99/450.1 |

FOREIGN PATENT DOCUMENTS

| | | | | |
|---|---|---|---|---|
| GB | 2252288 | A | * | 8/1992 |
| SU | 766562 | | * | 10/1980 |

* cited by examiner

*Primary Examiner* — Geoffrey S. Evans
*Assistant Examiner* — Mark Woodall
(74) *Attorney, Agent, or Firm* — Guice Patents PLLC

(57) ABSTRACT

An apparatus for improving surface smoothness and internal firmness of cylindrical food products is provided. The apparatus includes a conveyor belt for conveying cylindrical food products to a concave rolling zone below an output end, such that each of the cylindrical food products rolls in the rolling zone for an appropriate amount of time. Thus, surface smoothness and internal firmness of each of the cylindrical food products are improved.

5 Claims, 3 Drawing Sheets

APPARATUS FOR IMPROVING SURFACE SMOOTHNESS AND INTERNAL FIRMNESS OF CYLINDRICAL FOOD PRODUCTS

BACKGROUND OF THE INVENTION

1. Technical Field

The present invention relates to an apparatus for improving surface smoothness and internal firmness of cylindrical food products. More particularly, the present invention relates to an apparatus including a conveyor belt for conveying cylindrical food products to a concave rolling zone below an output end, such that each of the cylindrical food products rolls in the rolling zone for an appropriate amount of time, thereby improving surface smoothness and internal firmness of each of the cylindrical food products.

2. Description of Related Art

Conventional apparatuses for shaping and outputting cylindrical food products are disclosed, for example, in Taiwan Patent Publication No. 589149 and US Patent Application Publication No. US2005/0092186A1. As shown in FIG. 17 of the above-cited US Patent Application Publication, a round strip food 80 is shaped and output by rolling between a net 70 and a transfer belt surface 22. However, as the net 70 has a rough surface, the cylindrical surface of the resulting round strip food 80 is not smooth. Also, the stuffing inside the finished round strip food 80 is not firm enough. Furthermore, the round strip food 80 does not have a clearly defined cylindrical shape and therefore will be regarded as defective from the perspective of quality control of cylindrical food products (such as spring rolls).

BRIEF SUMMARY OF THE INVENTION

The primary objective of the present invention is to provide an apparatus for improving surface smoothness and internal firmness of cylindrical food products, wherein a first cylindrical food product is transferred by a moving conveyor belt to a rolling zone below an output end so as to roll in the rolling zone for a while, and wherein a second cylindrical food product transferred by the conveyor belt falls out of the output end and onto the first cylindrical food product so as to push the first cylindrical food product out of the rolling zone. Thus, each of a plurality of cylindrical food products is allowed to roll in the rolling zone for a certain period of time, and in consequence each of the cylindrical food products has its surface smoothness and internal firmness improved, and its cylindrical shape clearly defined.

BRIEF DESCRIPTION OF THE SEVERAL VIEWS OF THE DRAWINGS

The invention as well as a preferred mode of use, further objectives, and advantages thereof will be best understood by referring to the following detailed description of an illustrative embodiment in conjunction with the accompanying drawings, wherein.

DETAILED DESCRIPTION OF THE INVENTION

Figure 1:
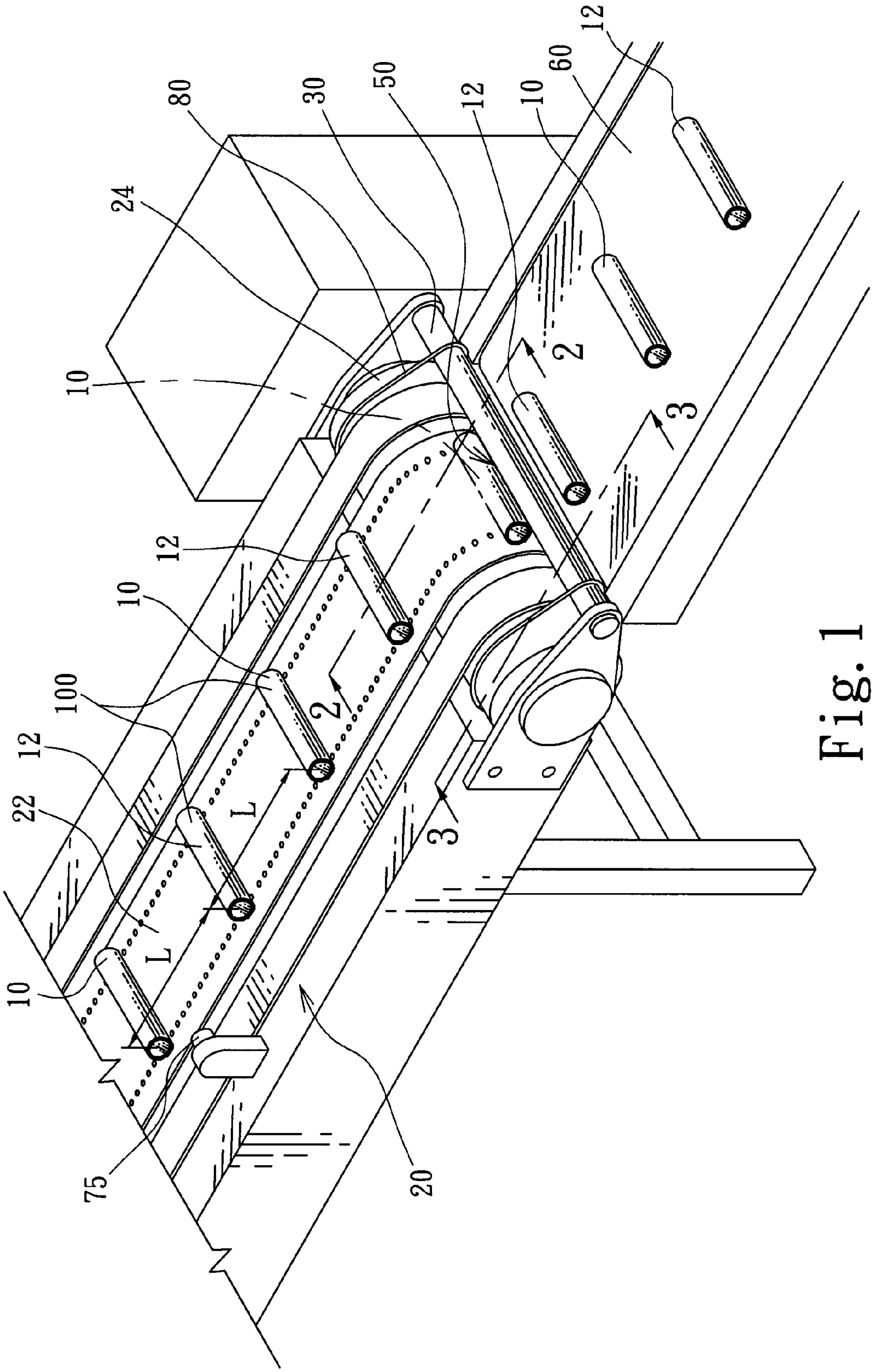
FIG. 1 is a perspective view of an apparatus according to the present invention for improving surface smoothness and internal firmness of cylindrical food products.

Referring FIG. 1, the present invention provides an apparatus for improving surface smoothness and internal firmness of cylindrical food products, wherein the apparatus includes a plurality of shaped cylindrical food products 100, a large roller 24, and a smaller roller 30.

The cylindrical food products 100 are separately disposed on a surface of a conveyor belt 22 of a conveyer 20 so as to be moved horizontally and synchronously.

The large roller 24 is provided at a front end of the conveyor 20 and configured to rotate actively, thereby driving the conveyor belt 22 to move forward horizontally and cyclically.

The small roller 30 is provided below an output end of the conveyor 20 such that a concave rolling zone 50 is formed between the small roller 30 and the large roller 24.

A first cylindrical food product 10 of the plural cylindrical food products 100 is transferred by the conveyor belt 22 and output from an output end of the conveyor belt 22 so as to fall into the rolling zone 50. Consequently, via rotation of the large roller 24 and of the small roller 30, the first cylindrical food product 10 rolls in the rolling zone 50 for an appropriate amount of time, thus allowing a surface of the first cylindrical food product 10 to keep rolling and sliding on the surface of the conveyor belt 22 and a surface of the small roller 30.

A second cylindrical food product 12 of the plural cylindrical food products 100 is transferred by the conveyor belt 22 and falls onto a lateral surface of the first cylindrical food product 10, thereby pushing the first cylindrical food product 10 out of the rolling zone 50. As a result, the first cylindrical food product 10 output from the rolling zone 50 has improved surface smoothness and increased internal firmness, and each of the cylindrical food products 100 has a clearly defined cylindrical shape.

Figure 2:
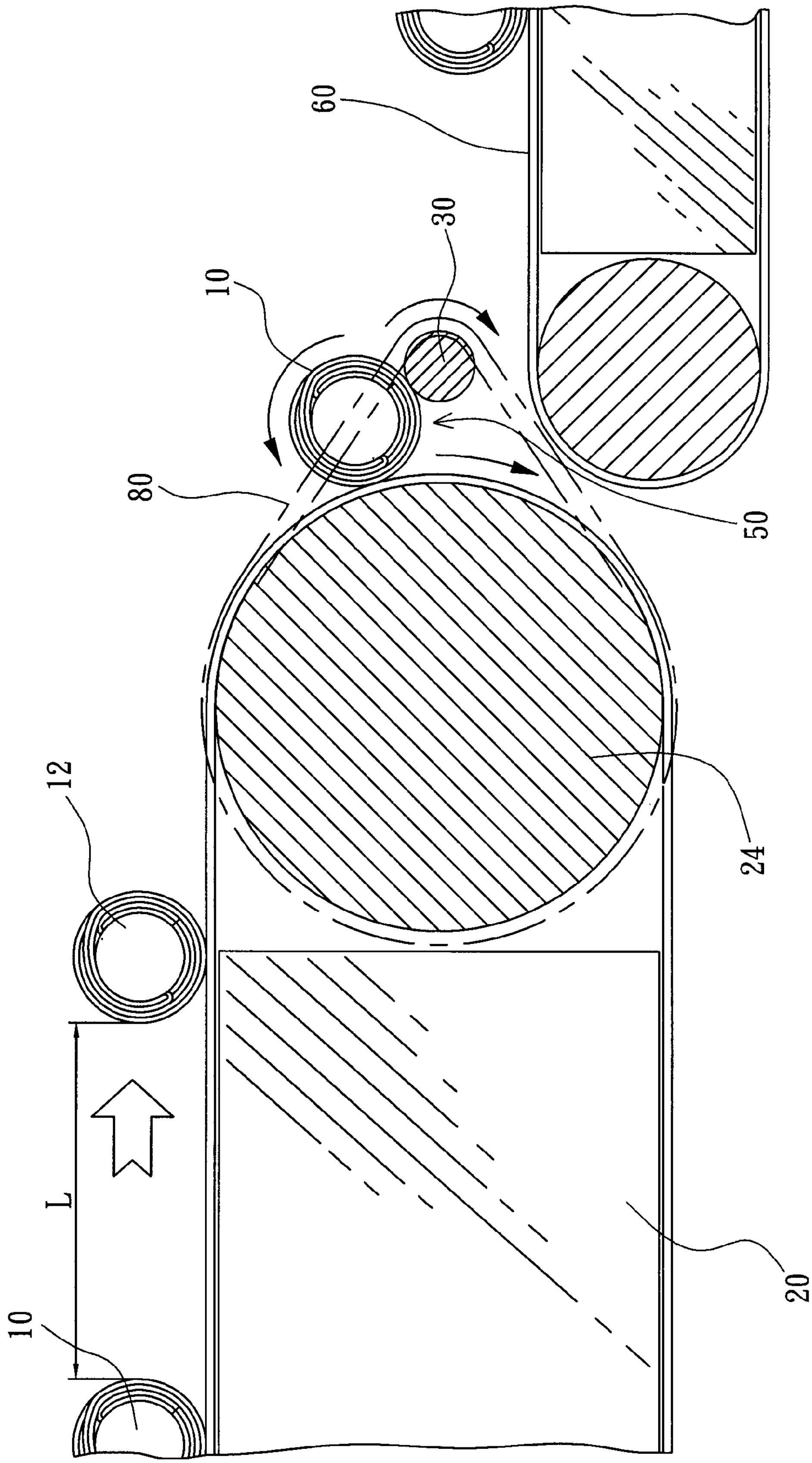
FIG. 2 is a partial sectional view of the apparatus according to the present invention.

Referring to FIG. 2, the small roller 30 is smaller than the large roller 24 in outer diameter, and the small roller 30 has a higher rotation speed than the large roller 24.

As shown in FIG. 2, at least one belt 80 is pivotally coupled to a surface of the large roller 24 and the surface of the small roller 30. Through the at least one belt 80, the large roller 24 drives the small roller 30 to rotate.

As shown in FIG. 1 and FIG. 2, a lower conveyor 60 is provided below and laterally of the small roller 30. Each of the first and second cylindrical food products 10, 12 falls onto the lower conveyor 60 for output.

As shown in FIG. 1 and FIG. 2, each pair of adjacent first and second cylindrical food products 10, 12 of the plural cylindrical food products 100 on the surface of the conveyor belt 22 is spaced by a distance L, which is constant. The distance L determines the time for which each of the first and second cylindrical food products 10, 12 rolls in the rolling zone 50.

As shown in FIG. 1, an optical sensor 75 is installed beside the conveyor 20 so as to detect the number of the plural cylindrical food products 100 transferred by the conveyor belt 22.

Referring to FIG. 1 and FIG. 2, a plurality of cylindrical food products 100 are transversely disposed on a surface of a conveyer belt 22. Each two adjacent ones of the cylindrical food products 100 are spaced by the same distance L. A large roller 24 rotates actively to drive the conveyor belt 22 forward horizontally and cyclically, thereby synchronously driving the plurality of cylindrical food products 100 to move forward in a specific direction. A first cylindrical food product 10 and a second cylindrical food product 12 are defined as each two adjacent ones of the cylindrical food products 100.

Figure 3:
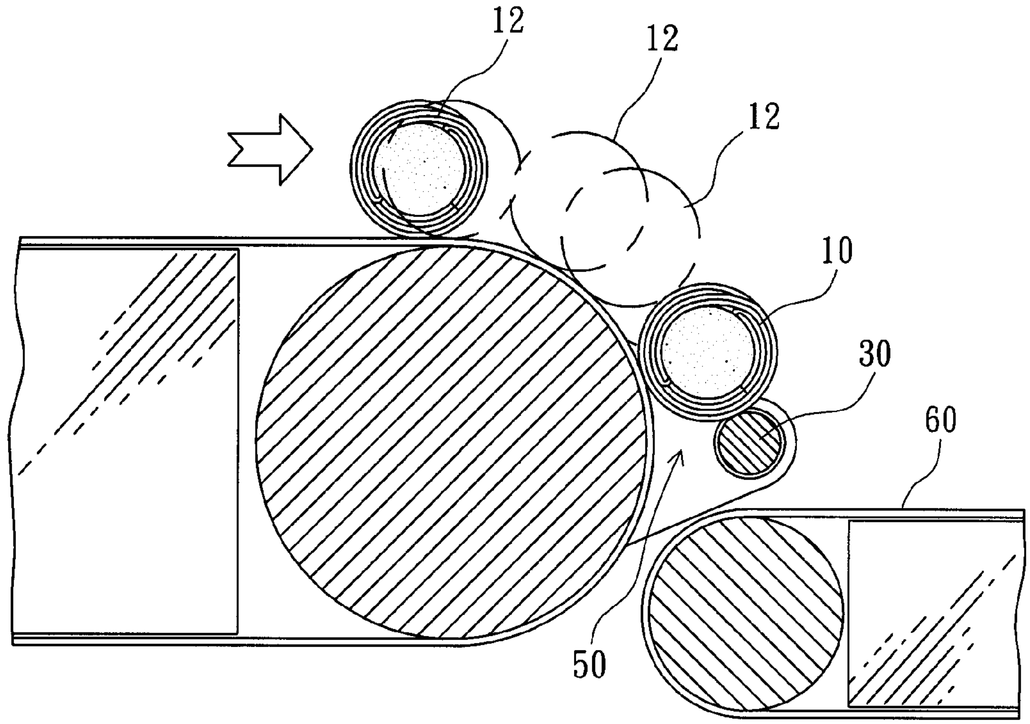
FIG. 3 is another partial sectional view of the apparatus according to the present invention, showing operation of the apparatus.
Figure 4:
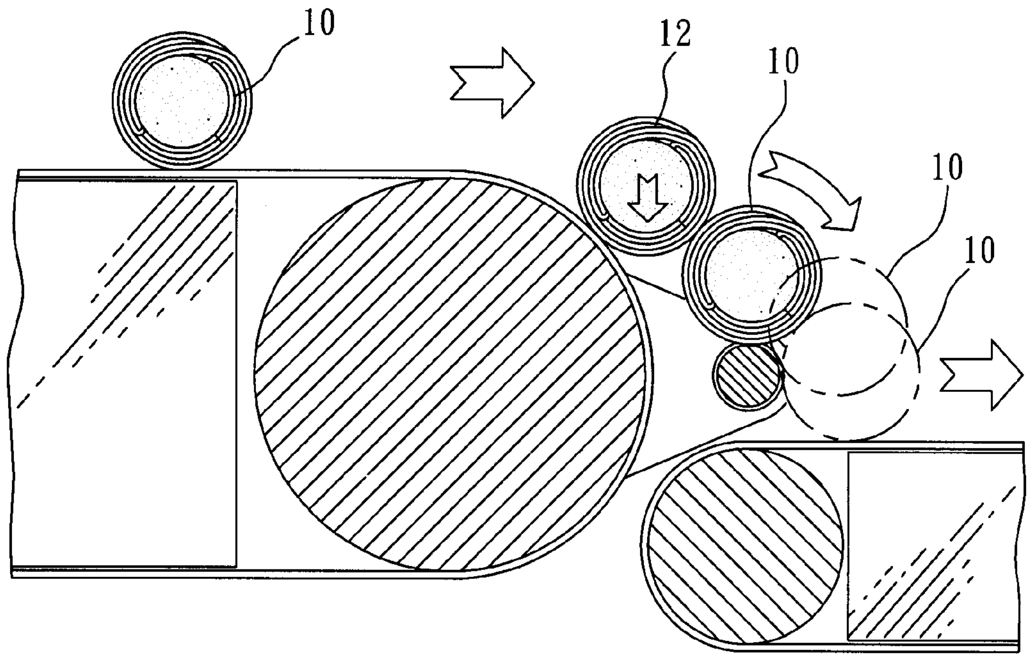
FIG. 4 is yet another partial sectional view of the apparatus according to the present invention, showing operation of the apparatus following the operation depicted in FIG. 3.

The first cylindrical food product 10 is moved along a curved surface of the large roller 24, which rotates clockwise, and falls into a concave rolling zone 50. Meanwhile, a small roller 30 is driven by the large roller 24 for clockwise rotation, such that the first cylindrical food product 10 spins and rolls in the rolling zone 50. As a result, the first cylindrical food product 10 has enhanced surface smoothness and increased internal firmness. After the first cylindrical food product 10 rolls for a while, the second cylindrical food product 12, which has been moved along the curved surface of the large roller 24, falls onto an inner lateral surface of the first cylindrical food product 10, as shown in FIG. 3. The weight of the fallen second cylindrical food product 12 pushes the first cylindrical food product 10 out of the rolling zone 50. Consequently, the first cylindrical food product 10 moves along a curved surface of the small roller 30 and falls onto a surface of a lower conveyer 60 for output, as shown in FIG. 4. Similarly, the second cylindrical food product 12 also rolls in the rolling zone 50 and, when a following first cylindrical food product 10 falls onto the second cylindrical food product 12, is pushed out of the rolling zone 50.

The distance L determines the time for which each of the first cylindrical food product 10 and the second cylindrical food product 12 rolls in the rolling zone 50. If it is desired to increase the surface smoothness and internal firmness of the cylindrical food products 100 to a higher level, the distance L can be extended.

As described above, the present invention is capable of achieving the intended objectives. Therefore, an application for patent of the present invention is hereby lawfully filed for examination.

What is claimed is:

1. An apparatus for improving surface smoothness and internal firmness of cylindrical food products, comprising:

a plurality of shaped cylindrical food products separately disposed on a surface of a conveyor belt so as to be moved horizontally and synchronously;

a large roller provided at a front end of a conveyor and configured for active rotation so as to drive the conveyor belt to move forward horizontally and cyclically; and a small roller provided below an output end of the conveyor such that the small roller and the large roller jointly form a rolling zone therebetween;

wherein a first said cylindrical food product transferred by the conveyor belt is output from an output end of the conveyor belt and falls into the rolling zone so as to roll in the rolling zone for an amount of time via rotation of the large roller and of the small roller, thus allowing a surface of the first said cylindrical food product to keep rolling and sliding on the surface of the conveyor belt and a surface of the small roller; and wherein a second said cylindrical food product transferred by the conveyor belt falls onto a lateral surface of the first said cylindrical food product, thereby pushing the first said cylindrical food product out of the rolling zone, such that the first said cylindrical food product output from the rolling zone has improved surface smoothness and increased internal firmness, as well as a clearly defined cylindrical shape.

2. The apparatus of claim 1, wherein at least a belt is pivotally coupled to a surface of the large roller and the surface of the small roller, such that the large roller drives the small roller to rotate via the at least a belt.

3. The apparatus of claim 1, wherein a lower conveyor is provided below and laterally of the small roller, such that each of the first said cylindrical food product and the second said cylindrical food product falls onto the lower conveyor for output.

4. The apparatus of claim 1, wherein each pair of adjacent first and second said cylindrical food products on the surface of the conveyor belt is spaced by a constant distance, the distance determining the time for which each first said cylindrical food product and each second said cylindrical food product roll in the rolling zone, respectively.

5. The apparatus of claim 1, wherein an optical sensor is installed beside the conveyor so as to detect the number of the plural cylindrical food products transferred by the conveyor belt.

* * * * *